United States Patent [19]

Winstrom et al.

[11] 3,708,583
[45] Jan. 2, 1973

[54] STABILIZED VITAMIN A ADDITIVE

[75] Inventors: Willis L. Winstrom; John T. Engel; Alan D. Sigler; George David Thomas, all of Omaha, Nebr.

[73] Assignee: Vitamin Premixers of Omaha, Inc., Omaha, Nebr.

[22] Filed: April 3, 1970

[21] Appl. No.: 25,586

[52] U.S. Cl. .................424/312, 424/173, 424/344
[51] Int. Cl. ............................................A61k 15/02
[58] Field of Search......424/173, 236, 237, 284, 344, 424/312; 99/2 V

[56] References Cited

UNITED STATES PATENTS

| | | | |
|---|---|---|---|
| 2,311,517 | 2/1943 | Buxton et al. | 424/237 |
| 3,149,037 | 9/1964 | Aiello et al. | 424/236 |
| 3,244,595 | 4/1966 | Feigh | 424/237 |
| 3,436,459 | 4/1969 | Kläui | 424/236 |

*Primary Examiner*—Albert T. Meyers
*Assistant Examiner*—Norman A. Drezin
*Attorney*—Henderson & Strom

[57] ABSTRACT

A stabilized vitamin additive is disclosed herein which comprises, in solution, fat-soluble vitamins, an alkyl alcohol wherein the alkyl moiety contains from one to three carbon atoms, and an emulsifier system. By utilizing these components in combination, biological deterioration and degradation of the vitamins during storage is substantially alleviated, the vitamin additive is pourable at low temperatures, and the vitamin additive does not separate, segregate or cream at high or low temperatures.

4 Claims, No Drawings

STABILIZED VITAMIN A ADDITIVE

BACKGROUND OF THE INVENTION

This invention relates to a stabilized vitamin additive for addition to animal feeds.

Vitamins have been used as additives to animal feed for many years to increase the rate of weight gain and improve resistance to disease and overall performance. Because vitamins are used in very small concentrations, additives or concentrates are generally prepared containing the vitamins. These additives are then added to the animal feed.

Addition of vitamin additives to animal feed has been complicated by the use of liquid animal feeds. The vitamins must be emulsified or solubilized prior to introduction into the animal feed to prevent layering and segregation of the vitamins in the feed. Additionally, the vitamin additives should be pourable at temperatures below 0° F. to be useful in winter feeding programs in the northern states.

In the past, two general techniques have been used in the preparation of vitamin additives intended for use in water based, liquid animal feeds. The first technique involves complete initial adjustment to a hydrophilic system (oil-in-water emulsions). The second technique involves the preparation of a solution of the vitamins in oil, (usually vegetable oil) together with emulsifiers in such a way that later additions to a water based liquid feed will result in an oil-in-water emulsion. In the second case, there is little adjustment of the solvent system and the vitamin additive is essentially lipophilic.

One apparent problem with these prior art techniques is that fat-soluble vitamins in oil-in-water emulsions have extremely poor stability. In all probability, this poor stability is due to air oxidation and the nucleophilic addition of water to the vitamins. In addition, these emulsions are extremely sensitive to low temperatures, generally freezing at 32° F. and frequently separating, layering, and creaming at temperatures as high as 60° F.

The oil solution vitamin additives exhibit somewhat improved stability over the oil-in-water emulsions, probably due to the elimination of the nucleophilic addition of water. However, the fat-soluble vitamins still have a limited shelf life. Physically, the viscosity of the oil solution vitamin additives increases rapidly with decreasing temperatures and few of these solutions are liquid enough to pour at 32° F.

These prior art techniques present two basic problems. The first problem involves lengthening the shelf life of fat-soluble vitamins in concentrate or additive form. The second problem involves depressing the freezing point of the vitamin additive to render it useful at depressed temperatures.

SUMMARY OF THE INVENTION

It is a primary object of this invention to provide a vitamin additive wherein biological deterioration and degradation of fat-soluble vitamins during storage periods is minimized.

A further object is to provide a vitamin additive which is pourable at low temperatures and does not segregate, separate, or cream at low temperatures.

Another object is to provide a vitamin additive which is easily emulsified in liquid feed supplements and water based, liquid feeds.

The above objects of this invention, as well as other objects which will become apparent from the specification and claims, are fulfilled by a vitamin additive comprising:

1. a fat-soluble vitamin selected from the group consisting of Vitamin A, Vitamin $D_2$, Vitamin $D_3$, and Vitamin E;
2. an alkyl alcohol wherein the alkyl moiety contains from one to three carbon atoms; and
3. an emulsifier system suitable for use in animal feeds which does not substantially change the solvent properties of said alkyl alcohol.

DESCRIPTION OF THE PREFERRED EMBODIMENTS

The vitamin additive of this invention is comprised of three primary components which are: fat-soluble vitamins, a short chain alcohol, and a suitable emulsifier system. These components are mixed together and generally form a true solution. This solution minimizes biological deterioration and degradation of the fat-soluble vitamins, increases pourability of the vitamin additive at low temperatures, and prevents segregation, layering, and creaming of the vitamin additive at low temperatures.

The short chain alcohol is the primary diluent and solvent of this vitamin additive and the remaining components are adjusted to the solvent system. Unlike the prior art vitamin additives, this additive is a true solution. The alcohol diluent system minimizes oxidation and deterioration of the fat-soluble vitamins to a far greater extent than the prior art diluent systems and the vitamin additive of this invention can be used at far lower temperatures.

THE ALCOHOL

Alkyl alcohols having from one to three carbon atoms in the alkyl moiety are used herein as diluents and are utilized as the central point for the adjustment of the system solvent properties. These alcohols are selected from the group consisting of methyl alcohol, ethyl alcohol, n-propyl alcohol, and isopropyl alcohol and mixtures thereof. Of this group, methyl alcohol and ethyl alcohol are preferred with ethyl alcohol being highly preferred.

These alcohols are miscible in both water and many oils and can, therefore, be utilized as solvents for most of the forms of the fat-soluble vitamins. The alcohols also serve to control the viscosity of the vitamin additive and act as freeze depressants. The vitamin additive has approximately the same viscosity as the alcohol being utilized and does not freeze at reduced temperatures. The high vapor pressure of these alcohols is also responsible for reducing oxidation, and concomitant deterioration of the biological properties, of the fat-soluble vitamins at the air-alcohol interface of the additive.

THE VITAMINS

The vitamins utilized in this invention may be generally described as fat-soluble vitamins. They are selected from the group consisting of Vitamin A, Vitamin $D_2$, Vitamin $D_3$, and Vitamin E.

Vitamin A occurs naturally as the alcohol and as the palmitate ester of that alcohol. The alcohol has the following general formula:

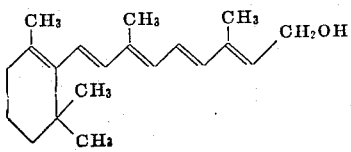

The alcohol form of Vitamin A is extremely unstable and is generally stored in the body as the palmitate ester. The commercial forms of Vitamin A are the palmitate and acetate esters of Vitamin A. These esters can be, and generally are, synthesized from materials other than naturally occuring Vitamin A [See, for example, Cram & Hammond, Organic Chemistry (1964) pages 574 – 575; Sebral and Harris, The Vitamins, Vol. I, (2nd ed. 1969)].

Vitamin A palmitate is the more widely accepted commercial form of Vitamin A although the acetate ester appears to have many, if not all, of the beneficial properties of Vitamin A palmitate. A number of Vitamin A esters can be synthesized wherein the ester moiety has a chain length of from about two to about 20 carbon atoms and all of these esters will have about the same biological properties. However, the palmitate esters and the acetate esters of Vitamin A are the generally accepted commercial forms of Vitamin A. In both of these esters of Vitamin A, other reaction products and chain lengths may be present due to present synthesis procedures.

The theoretical potency (100 percent pure) of the Vitamin A acetate and the Vitamin A palmitate is, respectively, 2.904 Million International Units per gram (M I.U./g.) and 1.817 M I.U./g. One international unit equals 0.3 micro grams of Vitamin A as the free alcohol, 0.344 micro grams of Vitamin A as the acetate ester and 0.550 micro grams as Vitamin A as the palmitate ester.

Vitamin $D_2$ has the following general formula:

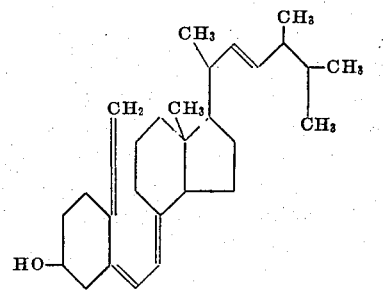

Vitamin $D_2$ has a theoretical potency of 40 M I.U./g. One international unit, therefore, equals 0.025 micro grams of Vitamin $D_2$.

Vitamin $D_2$ is considerably less expensive than Vitamin $D_3$ and is, therefore, preferred over Vitamin $D_3$ in most applications. However, fowl cannot utilize Vitamin $D_2$. If the vitamin additive of this invention is prepared for fowl, Vitamin $D_3$ should be utilized instead of Vitamin $D_2$.

Vitamin $D_3$ has the following general formula:

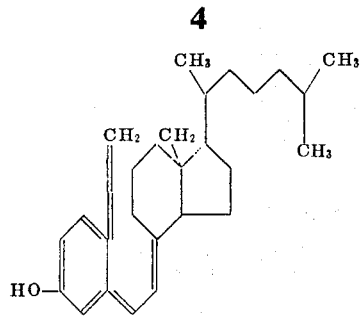

Vitamin $D_3$ occurs in the alcohol form and that form is the generally accepted commercial form. Vitamin $D_3$ has a theoretical potency of 40 M I.U./g. One international unit, therefore, equals 0.025 micro grams of Vitamin $D_2$.

Vitamin E, as d,L,$\alpha$-tocopherol, has the following general formula:

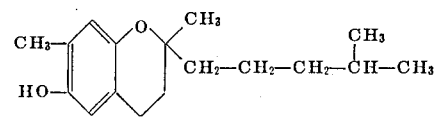

Other Vitamin E active compounds are also available and useful herein. Specific examples of these compounds include: tocol; 5-methyl tocol; 7-methyl tocol; $\alpha$-tocopherol; 5,7-dimethyl tocol; $\beta$-tocopherol; $\gamma$-tocopherol; tocotrienol; 5-methyl tocotrienol; 7-methyl tocotrienol; $\alpha$-tocotrienol; 5,7-dimethyl tocotrienol, $\beta$-tocotrienol, $\gamma$-tocotrienol. These materials exist as the free alcohols and as the esters of those alcohols. The ester moiety can contain from about two to about 20 carbon atoms. The optical isomers of these compounds can be used solely in the d form, solely in the L form or as racemic mixtures therefore. The various Vitamin E active compounds can also be mixed together in any combination for use herein.

The theoretical potency (100 percent pure) of d,L,$\alpha$-tocopherol acetate is 1000 I.U./g. One International unit, therefore, equals 1 milligram of d,L,$\alpha$-tocopherol acetate.

As herein used, Vitamin A, Vitamin $D_2$, Vitamin $D_3$, and Vitamin E include the naturally occuring forms of these products, all esterification products and other precursors and derivatives having biological activity.

All of the vitamins are considered to be soluble in ordinary organic solvents such as benzene, hexane, chloroform, etc. and are insoluble in water. Since liquid animal feeds are usually water based systems, a system of distribution of the vitamins must be employed. The system used herein involves dissolving the vitamins in the alcohol-emulsifier system which, in turn, is soluble in the water based, liquid feed.

THE EMULSIFIER SYSTEM

The emulsifier system utilized in this vitamin additive can be selected from the group consisting of nonionic, anionic and cationic emulsifiers and mixtures thereof. These emulsifiers must meet the Food and Drug Administration requirements for additives to animal feeds to be useful in commercial applications and must not substantially alter the solvent properties of the alcohols utilized herein.

The nonionic emulsifiers are highly preferred over the anionic and cationic emulsifiers. The anionic and cationic emulsifiers produce acceptable physical results but the charged particles may accelerate deterioration and decomposition of the fat-soluble vitamins.

The emulsifier system must not alter the solvent properties of the alcohols used herein. Therefore, the alcohol must still be miscible in water and miscible with oils to about the same extent as it was prior to addition of the emulsifier system. The required hydrophile-lipophile balance (HLB) of the emulsifier system, to maintain the solvent properties of the alcohols, should range from about 3 to about 17, preferably from about 5 to about 14. In general, most nonionic emulsifiers or mixtures of nonionic emulsifiers will meet these criteria.

Hydrophile-lipophile Balance (HLB) is a term originated by Atlas Chemical Company to describe the relative affinity of commercial emulsifiers for oils and water. It is defined as follows:

$$HLB = 20(1 - S/A):$$

Where
S = Saponification number of the ester and
A = Acid number of the recovered acid If one were to rate emulsifiers on a scale of 0 to 100, 0 being totally lipophilic and 100 being totally hydrophilic; HLB would be one-fifth of this value.

To be of practical use, an emulsifier system must be balanced between the oil and the solvent system into which it is dispersed. In the case where water is the solvent system, the Required HLB (Emulsifier system providing ideal balance) will decrease as the oil phase becomes less hydrophilic, e.g. as the carbon number of straight chain alcohols increases. Generally, an HLB range will provide satisfactory results; however, this range will narrow as the oil and water phases become more widely separated in solvent properties.

When short chain alcohols are substituted for water as the solvent system, the HLB scale is effectively compressed because most oils and oil-like compounds will dissolve to some extent in these alcohols and almost always to a greater extent than they would in water. Thus, the Required HLB for an alcohol solvent system will be lower than the Required HLB for a comparable water solvent system (from 15 to 30 percent lower, depending upon the chemical similarities and differences of the oils and emulsifiers). The acceptable HLB range will also be broadened. This compression of HLB scale by use of an alcohol solvent system produces solutions where comparable water solvent systems are emulsions. Only at extremely low temperatures does the alcohol system become an emulsion.

The following specific examples of emulsifiers have been found to be suitable for use in this feed additive; glycerol monolaurate, glycerol monooleate, glycerol monostearate, isopropyl esters of lanolin fatty acids, sorbitan monostearate, polyoxyethylene sorbitan monolaurate, polyoxyethylene sorbitan monooleate, polyoxyethylene sorbitan monostearate, polyoxyethylene sorbitan tristearate, diglycol laurate, diglycol oleate, diglycol stearate, propylene glycol monostearate, ethylene glycol distearate, glycerol-lacto palmitate, glycerol-lacto stearate, monoglycerides of animal fats, monoglycerides of coconut oil, monoglycerides of peanut oil, glycerol monopalmitate, sorbitan monolaurate, sorbitan monooleate, sorbitan monopalmitate, and sorbitan tristearate.

The Tweens and Spans and mixtures thereof, commercial nonionic emulsifiers, have been found to be especially useful in preparing the solutions of this invention.

ANTI-OXIDANTS

In this invention, it is helpful to utilize a strong anti-oxidant to prevent biological deterioration and degradation of the vitamins. One of the very useful anti-oxidants known in the art which can be utilized herein is Ethoxyquin, 6-ethoxy-1,2-dihydro-2,2,4-trimethyl quinolin, having the following general formula:

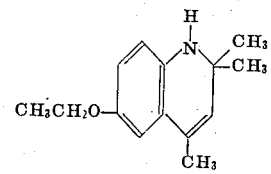

The addition of an anti-oxidant, lengthens shelf life and further minimizes biological deterioration and degradation of the vitamins. Ethoxyquin is preferentially oxidized in solution and thereby protects the fat-soluble vitamins from deterioration and degradation.

Yeast and mold inhibitors and preservatives can also be added to the vitamin additive of this invention. Compounds which fall into these general classifications are buterated hydroxytoluene, buterated hydroxyamine, sorbic acid and sodium propionate.

In addition, flavoring agents which comprise no part of the present invention can be added to the vitamin additive to improve the esthetic qualities of the additive.

THE COMPLETE ADDITIVE

In preparing the stabilized vitamin additive, the alcohols are generally utilized in an amount ranging from about 20 percent to about 90 percent by weight of the additive. Preferably, and usually, the alcohol is used in an amount ranging from about 25 percent to about 80 percent by weight of the total vitamin additive.

The emulsifiers are used herein in an amount ranging from 3 to 60 percent by weight of the vitamin additive. Preferably, that amount ranges from about 5 percent to about 35 percent of the total weight.

The weight percentages of the vitamins suitable for use herein are expressed below. The weight percentages are expressed as 100 percent pure vitamins. It should be realized that in most commercial forms of these vitamins, some ill-defined reaction products, decomposition products and starting materials are present. Vegetable and animal oils may also be present as standarization components. These extraneous components do not materially effect the vitamin additive of this invention.

The following use ranges, expressed in weight percentage of the vitamin additive, are suitable for use herein:

| Vitamin (100% pure) | Weight Percent |
|---|---|
| Vitamin A | 0.02% to 68% |
| Vitamin $D_2$ | 0.01% to 5% |
| Vitamin $D_3$ | 0.01% to 5% |
| Vitamin E | 0.1% to 75% |

It should be understood that the above vitamins will be stabilized in solution in amounts outside the above ranges. The above ranges do, however, refer to the commercial embodiments of this invention.

Although these vitamins are generally used in combination, any one of the vitamins can be used by itself in the additive of this invention.

Because this vitamin additive is preferably a true solution, the sequence of addition of the various components is not important. The components can be added in any sequence and a solution is obtained. As suspected, stirring of the components facilitates solubilization.

In initial studies with this vitamin additive, Vitamin A palmitate was utilized. Vitamin A palmitate does not dissolve in alcohol. It separates immediately and appears as oily globules in the solvent.

Vitamin A acetate was then used. Vitamin A acetate is readily dissolved in ethyl alcohol but, at temperatures below 32° F., Vitamin A acetate crystalizes from solution. The use of both commercial forms of Vitamin A, therefore, posed problems with regard to solubility and low temperature stability.

On further experimentation, it was found that mixtures of Vitamin A acetate and Vitamin A palmitate in the critical range of from about 85 percent acetate and 15 percent palmitate to about 60 percent acetate and 40 percent palmitate were completely soluble in the alcohols used herein. In this mixture, the Vitamin A did not precipitate from solution and did not crystalize even at extremely low temperatures. Thus modified, the Vitamin A mixture of esters remains in solution form down to −15° F. Between −15° F. and −20° F. there is a transition from a solution to an oil-in-alcohol emulsion which remains stable to temperatures of −35° F. Subsequent warming of the vitamin additive to −15° F. restores the solution form.

Vitamins $D_2$, $D_3$ and E are completely soluble in the alcohols used herein. No solubility problems are apparent with these components.

Anti-oxidants such as Ethoxyquin are generally added in amounts sufficient to minimize biological deterioration of the vitamins. It should be understood, however, that the amount of Ethoxyquin in the finished feed product cannot exceed 0.015 percent by weight because of present FDA requirements.

The vitamin additive of this invention is utilized as an additive to animal feed. It is used in amounts ranging from about 0.008 to about 0.360 pounds per ton of animal feed. It is preferred that an animal feed composition be attained which contains from about 500 to 20,000 I.U./lb. of Vitamin A. 100 to 100,000 I.U./lb. of Vitamin $D_2$, 100 to 100,000 I.U./lb. of Vitamin $D_3$, and from 0.1 to 100 I.U./lb. of Vitamin E.

It should be understood that these vitamins can be used either alone or in any of various combinations as shown in the examples.

There is considerable latitude in the relative proportions of these basic components and a number of other substances may be added for specialized purposes, such as flavoring ingredients, without affecting the performance of the overall system.

EXAMPLES

The following examples illustrate specific preferred embodiments of this invention and are not intended to be limiting. All percentages and ratios in the following examples, as well as the specification and the appended claims, are by weight unless otherwise indicated. Temperatures are expressed in degrees Fahrenheit.

Vitamins A, $D_2$, $D_3$, and the antioxidant, Ethoxyquin, bear marked similarities in the way in which they deteriorate and the conditions which accelerate this process. Because Ethoxyquin is more readily destroyed than any of the vitamins (its use as an anti-oxidant is related to this property) and because Vitamin A is more sensitive to deterioration than Vitamins $D_2$ and $D_3$, more reliable analytical tests are available to measure deterioration of Vitamin A and Ethoxyquin. Therefore, more extensive stability data was obtained for these two materials.

EXAMPLE I

The following vitamin additives were prepared according to this invention. Each of the vitamin additives contain fat-soluble vitamins, a short chain alcohol, and an emulsifier system which facilitates the solubilization of the vitamin additive in a liquid, water based, animal feed and does not substantially change the solvent properties of the alcohol.

Formula A

| Component | % by weight |
| --- | --- |
| Vitamin A (100% pure acetate ester) | 9.6 |
| Vitamin A (100% pure palmitate ester) | 4.1 |
| Vitamin $D_2$ (100% pure) | 0.168 |
| Vitamin E (100% pure) | 0.15 |
| Ethoxyguin | 1.5 |
| Sorbitan Monooleate | 20.0 |
| Glycerosis products of edible fats | 5.0 |
| Cinnamic Aldehyde | 0.027 |
| Buterated Hydroxytoluene | 0.054 |
| Buterated Hydroxyamine | 0.054 |
| Anethol | 0.054 |
| Ethyl Alcohol (SD-35A; 95% ethyl alcohol and 5% ethyl acetate) | 54.0 |
| Miscellaneous reaction and addition products from the commercial vitamin mixtures | 5.293 |

Vitamin A acetate and Vitamin A palmitate in a ratio of about 70 percent Vitamin A acetate and 30% Vitamin A palmitate by weight are utilized in this vitamin additive to obtain improved low temperature stability characteristics. Vitamin A as the acetate ester and as the palmitate ester are easily dissolved in the alcohol. The Vitamin A palmitate does not precipitate from solution and no crystalization of Vitamin A acetate is noticeable at temperatures below zero degrees Fahrenheit. Ethoxyquin is added as an anti-oxidant. The emulsifier system is comprised of sorbitan monooleate and the glycerosis products of edible fats. No substantial change in the solvent properties of ethyl alcohol was observed.

Formula B

| Component | % by weight |
| --- | --- |
| Vitamin A (100% acetate ester) | 9.6 |
| Vitamin A (100% palmitate ester) | 4.1 |
| Ethoxyquin | 1.5 |

| Sorbitan monopalmitate | 17.5 |
|---|---|
| Monoglycerides of peanut oil | 7.5 |
| Cinnamic Aldehyde | 0.027 |
| Buterated Hydroxytoluene | 0.054 |
| Sodium Propionate | 0.054 |
| Sorbic Acid | 0.054 |
| Anethol | 0.054 |
| Denatured Ethyl Alcohol (SD-35A | 53.057 |
| Miscellaneous Reaction and Addition Products | 5.5 |

The vitamin additive was prepared which contained Vitamin A, an emulsifier system, denatured ethyl alcohol and anti-oxidant. Vitamin A was utilized as a mixture of the acetate ester and the palmitate ester to improve low temperature stability and to prevent precipitation of Vitamin A palmitate. Ethoxyquin was utilized to further minimize oxidation of the Vitamin A. The emulsifier system was comprised of 17.5 percent sorbitan monopalmitate and 7.5 percent of monoglycerides of peanut oil. No substantial change in the solvent properties of ethyl alcohol was observed. Cinnamic aldehyde and anethol were added as flavoring agents while buterated hydroxytoluene, sodium propionate and sorbic acid were added as yeast and mold inhibitors and preservatives.

Formula C

| Component | % by weight |
|---|---|
| Vitamin E (100% pure) | 20.05 |
| Sorbitan monolaurate | 15.0 |
| Glycerosis Products of edible fats | 10.0 |
| Cinnamic Aldehyde | 0.054 |
| Buterated Hydroxytoluene | 0.054 |
| Sodium Propionate | 0.054 |
| Sorbic Acid | 0.054 |
| Anethol | 0.054 |
| Denatured Ethyl Alcohol (SD-35A) | 54.707 |

The only vitamin utilized in this formulation was Vitamin E. The vitamin additive of this invention exhibited a low viscosity and was pourable at low temperatures. No substantial change in the solvent properties of ethyl alcohol was observed.

Formula D

| Component | % by weight |
|---|---|
| Vitamin A (100% pure acetate ester) | 19.2 |
| Vitamin A (100% pure palmitate ester) | 8.2 |
| Ethoxyquin | 3.0 |
| Vitamin $D_3$ (100% pure) | 0.338 |
| Vitamin E (100% pure) | 0.3 |
| Sorbitan monostearate | 33.8 |
| Glycerosis products of vegetable oils | 3.38 |
| Cinnamic Aldehyde | 0.027 |
| Buterated hydroxytoluene | 0.054 |
| Sodium Propionate | 0.054 |
| Anethol | 0.054 |
| Sorbic Acid | 0.054 |
| Ethyl Alcohol | 20.177 |
| Miscellaneous Reaction and Addition Products | 11.416 |

In this vitamin feed additive for poultry, the emulsifier system was comprised of sorbitan monostearate and the glycerosis products of vegetable oils. Vitamin A acetate and Vitamin A palmitate were utilized in admixture to increase low temperature stability of the Vitamin A. No substantial change in the solvent properties of ethyl alcohol was observed.

Formula E

| Component | % by weight |
|---|---|
| Vitamin $D_2$ (100% pure) | 0.506 |
| Ethoxyquin | 3.0 |
| Sorbitan monooleate | 15.0 |
| Glycerosis products of vegetable fats | 5.0 |
| Cinnamic Aldehyde | 0.027 |
| Buterated Hydroxytoluene | 0.054 |
| Sodium Propionate | 0.054 |
| Anethol | 0.054 |
| Denatured Ethyl Alcohol | 76.061 |
| Plant Sterol residue from Vitamin $D_2$ | 0.244 |

Only Vitamin $D_2$ was utilized in this feed additive. Biological deterioration and degradation of Vitamin $D_2$ was minimal. The emulsifier system comprised sorbitan monooleate and glycerosis products of vegetable fats. No substantial change in the solvent properties of ethyl alcohol was observed.

In all of these formulations, biological deterioration and degradation of the fat-soluble vitamins were substantially decreased when compared with oil-in-water emulsions and lipophilic systems. Even when added to animal feeds, the stability of these vitamins were markedly superior to fat-soluble vitamins which had not been formulated as a part of the vitamin additive of this invention.

EXAMPLE II

The following vitamin additives were prepared according to this invention. The components are expressed in grams rather than weight percent. These vitamin additives contained only a fat-soluble vitamin, ethyl alcohol and an emulsifier system. In all of these formulations, biological deterioration and degradation of the vitamins was substantially decreased when compared with vitamin additives of the oil-in-water emulsion type and the lipophilic systems described hereinbefore.

Formula 1

| Component | gms |
|---|---|
| Vitamin A (as acetate ester) | 9.6 |
| Sorbitan monooleate | 17.5 |
| Vitamin A (as palmitate ester) | 4.1 |
| Vitamin D2 | .168 |
| Glycerosis products of fats | 5.0 |
| Ethyl Alcohol (SD-35A) | 63.8 |

Formula 2

| Component | gms |
|---|---|
| Vitamin A (as acetate ester) | 19.2 |
| Vitamin A(as palmitate ester) | 8.2 |
| Sorbitan monooleate | 33.8 |
| Glycerosis products of fats | 3.38 |
| Ethyl Alcohol (SD-35A) | 35.4 |

Formula 3

| Component | gms |
|---|---|
| Vitamin $D_2$ | .506 |
| Sorbitan monooleate | 15.0 |
| Glycerosis products of fats | 5.0 |
| Ethyl Alcohol (SD-35A) | 80.0 |

Vitamin A is known to decompose rapidly at high temperatures and under ultraviolet light. Formula 1 was subjected to boiling and high intensity ultraviolet light with the following results.

| Material | Time Elapsed | % Decomposition |
|---|---|---|
| Vitamin A | 30 minutes | 0.9 |
| Vitamin A | 45 minutes | 3.1 |
| Vitamin A | 60 minutes | 4.2 |

A lipophilic system of the following components was subjected to these same conditions:

| Material | % by Weight |
|---|---|
| Vitamin A (as acetate ester) | 25 |
| Sorbitan monooleate | 25 |
| Corn oil | 50 |

The following results were obtained:

| Material | Time Elapsed | % Decomposition |
|---|---|---|
| Vitamin A | 30 minutes | 8.2 |
| Vitamin A | 45 minutes | 9.8 |
| Vitamin A | 60 minutes | 12.4 |

Biological deterioration of Vitamin A in the lipophilic system was substantially higher than in the vitamin additive of this invention.

An oil-in-water emulsion similar to Formula 1 was prepared as follows (Components expressed grams.).

| Material | gms |
|---|---|
| Vitamin A (as acetate ester) | 13.75 |
| Vitamin $D_2$ | 0.25 |
| Vitamin E | 0.15 |
| Ethoxyquin | 1.5 |
| Sorbitan Monooleate | 20.0 |
| Glycerosis Products of fats | 5.0 |
| Buterated Hydroxyamine | 0.054 |
| Buterated Hydroxytoluene | 0.054 |
| Sodium Propionate | 0.054 |
| Water | 59.2 |

This oil-in-water emulsion was subjected to the same conditions as Formula 1 with the following results:

| Material | Time Elapsed | % Decomposition |
|---|---|---|
| Vitamin A | 30 minutes | 6.0 |
| Vitamin A | 45 minutes | 11.7 |
| Vitamin A | 60 minutes | 19.1 |
| Ethoxyquin | 30 minutes | 11.1 |
| Ethoxyquin | 45 minutes | 17.0 |
| Ethoxyquin | 60 minutes | 19.2 |

Even with the addition of an antioxidant to the system, deterioration of Vitamin A was substantially greater than in Formula 1 above.

Long term stability tests at room temperature were also run with the following results.

| Material | Time Elapsed | % of Initial Potency |
|---|---|---|
| Vitamin A | 0 days | 100% |
| Vitamin A | 30 days | 87% |
| Vitamin A | 60 days | 78.6% |
| Vitamin A | 90 days | 69.2% |

Nearly 31 percent of the Vitamin A in this oil-in-water emulsion was destroyed in 90 days.

EXAMPLE III

Heat and ultraviolet light are known to destroy Vitamin A rapidly. A sample of Formula A of Example I was subjected to a high intensity ultraviolet light and boiled with the following results:

| Material | Time Elapsed | % Decomposition |
|---|---|---|
| Formula A | 30 minutes | 0.3% |
| Formula A | 45 minutes | 2.1% |
| Formula A | 60 minutes | 3.0% |
| Ethoxyquin | 30 minutes | 2.0% |
| Ethoxyquin | 45 minutes | 3.8% |
| Ethoxyquin | 60 minutes | 4.7% |

Biological deterioration of Vitamins A, $D_2$ and E was minimal. In oil-in-water emulsions and lipophilic systems containing these vitamins, the vitamins deteriorate at a significantly more rapid rate (See Example II).

It should be observed that Ethoxyquin deteriorated at a significantly more rapid rate than Vitamin A. When Vitamin A deteriorates it is first isomerized to one of the cis forms and then may be degraded further.

EXAMPLE IV

The following data represents averages of results obtained by replicate analyses on six formula variations employing both colorimetic and gas chromatography methods.

The vitamin additive formulas utilized in the following tests were:

Formula 1. Formula A (Example I)
Formula 2. Formula B (Example I)
Formula 3. Formula D (Example I)

Formula 4.

| Material | Grams |
|---|---|
| Vitamin A (as acetate ester) | 5.76 |
| Vitamin A (as palmitate ester) | 2.40 |
| Vitamin $D_2$ | 0.162 |
| Vitamin E | 5.05 |
| Ethoxyquin | 1.0 |
| Soribitan Monooleate | 17.5 |
| Glycerosis Products of fats | 4.375 |
| Ethyl alcohol | 55.15 |

Formula 5.

| Material | Grams |
|---|---|
| Vitamin A (as acetate ester) | 9.6 |
| Vitamin A (as palmitate ester) | 4.1 |
| Ethoxyquin | 1.5 |
| Sorbitan monooleate | 17.5 |
| Glycerosis Products of fats | 7.75 |
| Ethyl alcohol | 59.55 |

Formula 6.

| Material | Grams |
|---|---|
| Vitamin A (as acetate ester) | 9.6 |
| Vitamin A (as palmitate ester) | 4.1 |
| Vitamin $D_3$ | 0.168 |
| Ethoxyquin | 1.5 |
| Sorbitan monooleate | 17.75 |
| Glycerosis Products of fats | 2.25 |
| Ethyl alcohol | 59.13 |

The results of the replicate analyses are as follows:

| Material | Time Elapsed | % of Initial Potency |
| --- | --- | --- |
| Vitamin A | 30 days | 100.92 |
| Vitamin A | 60 days | 99.93 |
| Vitamin A | 90 days | 100.32 |
| Ethoxyquin | 30 days | 94.0 |
| Ethoxyquin | 60 days | 91.0 |
| Ethoxyquin | 90 days | 86.0 |

EXAMPLE V 10.3 pounds of the vitamin additive of this invention, Formula A, Example I was added to 46,000 pounds of a feed supplement having the following general formulation:

| Component | % by weight |
| --- | --- |
| Water | 29.5 |
| Molasses | 25.0 |
| Phosphonic Acid | 5.0 |
| Trace minerals | 25.5 |
| Urea | 15.0 |

The potency of the Vitamin A was determined at seven day intervals as shown below.

| Material | Time Elapsed | % of Initial Potency |
| --- | --- | --- |
| Vitamin A | 7 days | 98.2 |
| Vitamin A | 14 days | 100.3 |
| Vitamin A | 21 days | 98.0 |
| Vitamin A | 28 days | 96.0 |

As shown above, there was no significant deterioration of Vitamin A even after a period of 28 days. When oil-in-water emulsions containing vitamins are mixed with the above feed supplement, potency losses of up to 50 percent have been observed in 28 days.

The above feed supplement is generally added to animal feeds. The vitamin additive of this invention should comprise from about 0.008 to about 0.360 pounds per ton of finished feed.

EXAMPLE V

When, in the previous examples, methyl alcohol, n-propyl alcohol, or isopropyl alcohol, or mixtures of methyl alcohol, ethyl alcohol, n-propyl alcohol and/or isopropyl alcohol are substituted for ethyl alcohol substantially the same results are obtained in that the vitamins are stabilized and the vitamin additive is pourable at depressed temperatures.

When, in the previous examples, the following emulsifiers are utilized to replace those listed, substantially the same results are obtained: glycerol monolaurate, glycerol monooleate, glycerol monostearate, isopropyl esters of lanolin fatty acids, sorbitan monostearate, polyoxyethylene sorbitan monolaurate, polyoxyethylene sorbitan monooleate, polyoxyethylene sorbitan monostearate, polyoxyethylene sorbitan tristearate, diglycol laurate, diglycol oleate, diglycol stearate, propylene glycol monostearate, ethylene glycol distearate, glycerol-lacto palmitate, glycerol-lacto stearate, monoglycerides of animal fats, monoglycerides of coconut oil, monoglycerides of peanut oil, glycerol monopalmitate, sorbitan monolaurate, sorbitan monooleate, sorbitan monopalmitate, and sorbitan tristearate.

In the previous examples the Vitamin E active compound was d,L,$\alpha$-tocopherol acetate. The following Vitamin E active compounds are substituted therefor with substantially the same results: tocol; 5-methyl tocol; 7-methyl tocol; $\alpha$-tocopherol; 5,7-dimethyl tocol; $\beta$-tocopherol; $\gamma$-tocopherol; tocotrienol; 5-methyl tocotrienol; 7-methyl tocotrienol; $\alpha$-tocotrienol; 5,7-dimethyl tocotrienol, $\beta$-tocotrienol, $\gamma$-tocotrienol.

We claim:

1. A stabilized vitamin additive consisting of a solution of Vitamin A in an amount from 0.02 to 68 weight per cent of said additive, wherein said Vitamin A is a mixture of from about 85 to 60 percent Vitamin A acetate and from about 15 percent to about 40 percent Vitamin A palmitate, in a mixture of from about 20 percent to about 90 percent by weight of said additive of an alkyl alcohol selected from the group consisting of methyl, ethyl, n-propyl and isopropyl alcohol and mixtures thereof, and from about 3 percent to about 60 percent by weight of said additive of a nonionic emulsifier suitable for use in animal feeds having a hydrophile-lipophile balance of from about 3 to about 17 and which does not substantially change the solvent properties of said alcohol.

2. The stabilized vitamin additive of claim 1 wherein said alcohol is ethyl alcohol.

3. The stabilized vitamin additive of claim 2 wherein said emulsifier comprises from about 5 percent to about 35 percent of the vitamin additive and said alcohol comprises from about 25 percent to about 80 percent of the vitamin additive.

4. The stabilized vitamin additive of claim 3 wherein the nonionic emulsifier has a hydrophile-lipophile balance ranging from about 5 to about 14.

* * * * *